United States Patent
Merrell

[11] 3,856,181
[45] Dec. 24, 1974

[54] INFLATOR
[75] Inventor: Richard L. Merrell, Huron, Ohio
[73] Assignee: General Motors Corporation, Detroit, Mich.
[22] Filed: June 25, 1973
[21] Appl. No.: 373,284

[52] U.S. Cl. .............................. 222/5, 280/150 AB
[51] Int. Cl. ........................................ F17c 7/00
[58] Field of Search ............. 222/3, 5; 280/150 AB; 9/316, 324; 23/281; 137/68, 69; 141/19

[56] References Cited
UNITED STATES PATENTS
| | | | |
|---|---|---|---|
| 3,209,937 | 10/1965 | Hirst et al. | 137/69 X |
| 3,637,110 | 1/1972 | Cirillo et al. | 222/3 |
| 3,651,988 | 3/1972 | Cirillo | 222/3 |
| 3,663,036 | 5/1972 | Johnson | 222/5 X |

Primary Examiner—Robert B. Reeves
Assistant Examiner—Francis J. Bartuska
Attorney, Agent, or Firm—Herbert Furman

[57] ABSTRACT

An inflator of the augmented type includes a pressure vessel having an outlet opening to an occupant restraint system and a combustion chamber containing a gas generating charge of propellant and having an outlet opening to the pressure vessel. A rupturable seal closes the pressure vessel outlet. A pressure deflectable and rupturable seal closes the outlet of the combustion chamber. A rod has one end fixed to the pressure vessel seal and the other end fixed to the combustion chamber seal to rigidly interconnect these members to each other. When the pressure vessel is filled, the pressure of the fluid seats the deflectable seal on the combustion chamber to correspond the spacing of the seals to the length of the rod. By fixedly interconnecting the seals, the pressure of the fluid on one seal tending to rupture it in one direction is resisted by the pressure of the fluid on the other tending to rupture it in the other direction.

4 Claims, 3 Drawing Figures

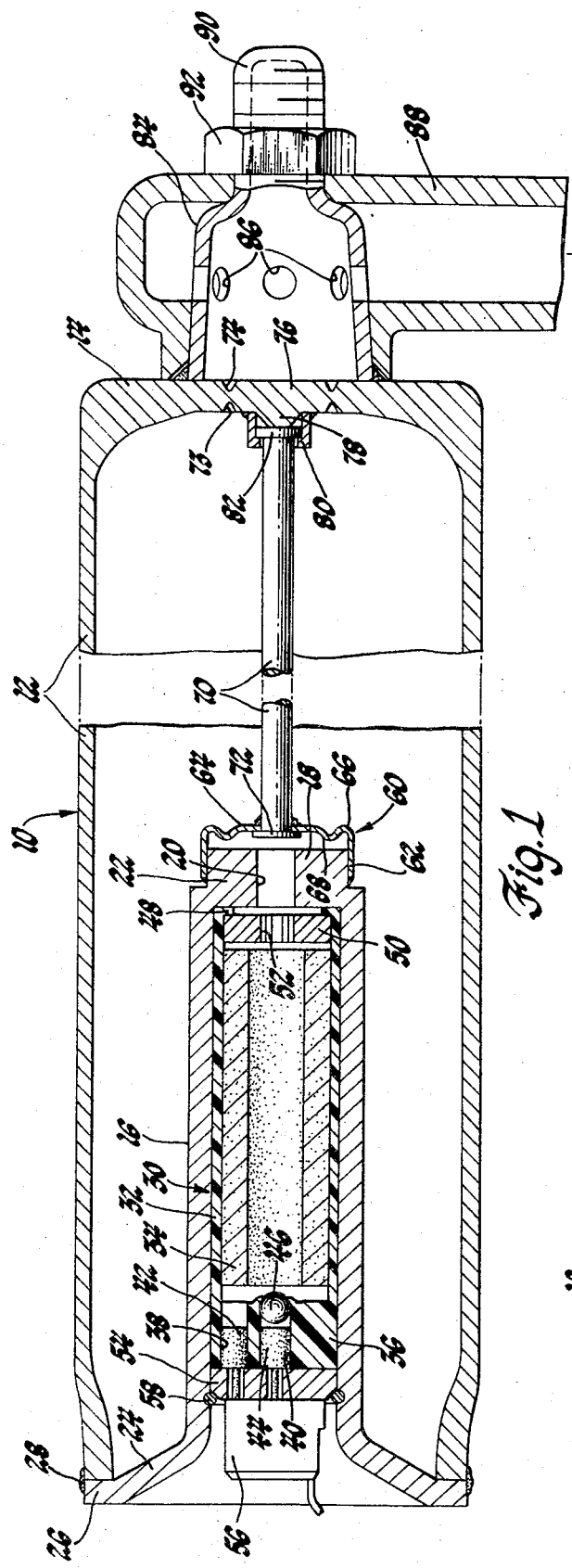

INFLATOR

This invention relates generally to inflators of the augmented type and more particularly to an improved sealing arrangement for sealing the outlet of the pressure vessel to an occupant restraint cushion and the outlet of the combustion chamber to the pressure vessel.

Conventionally, inflators of the augmented type have a combustion chamber separate from the pressure vessel. The pressure vessel outlet to the cushion is conventionally sealed by either an integral severable plug or by a pressure rupturable diaphragm. The outlet from the combustion chamber to the pressure vessel is likewise conventionally sealed by either an integral severable plug or by a rupturable diaphragm. It is also known to mount an impact member, such as a rod, on the seal for the combustion chamber outlet and to have this member impact and sever or rupture the seal for the pressure vessel outlet to thereby simultaneously open both outlets when the pressure of the generated gas within the combustion chamber reaches a predetermined level.

The pressure vessel fluid is at a nominal working pressure, such as 2,400 psi. However, when the vessel is filled and tested, the pressure of the fluid therein is much higher than the nominal working pressure, such as 4,500 psi. Thus, the seals for the pressure vessel and combustion chamber outlets must be able to withstand the higher test and fill pressure.

In the preferred embodiment of the invention, the seals for the pressure vessel and for the combustion chamber are coaxial and are fixedly interconnected. The seal for the pressure vessel includes a pressure deflectable portion which moves slightly into backing engagement with the outlet wall of the combustion chamber under the pressure of the fluid in the pressure vessel to thereby adjust the spacing of the seals to the length of the rod. Since the seals are fixedly interconnected, the pressure of the fluid on one seal tending to rupture it in one direction is resisted by the pressure of the fluid on the other tending to rupture it in an opposite direction. Thus, the seals support each other and each can be made to withstand less pressure than the highest pressure in the pressure vessel since the seals are fixedly interconnected.

One feature of this invention is that it provides an improved sealing arrangement for an augmented type inflator wherein the seals for the pressure vessel and combustion chamber mutually cooperate with each other to resist rupture of the seals by the pressure of the fluid within the pressure vessel. Another feature of this invention is that the seals are fixedly interconnected and are oppositely rupturable under the pressure of the fluid in the pressure vessel so that the seals mutually cooperate to resist rupture by the pressure of the fluid. A further feature of this invention is that the seals are fixedly interconnected by an elongate member and at least one of the seals is adjustable under the pressure of the fluid so as to correspond the spacing of the seals with the length of the member. Yet another feature of this invention is that the one seal is backed up by a rigid portion of the inflator after adjustment thereof.

These and other features of the invention will be readily apparent from the following specification and drawings wherein:

FIG. 1 is a sectional view of an inflator according to this invention;

FIG. 2 is a partial sectional view of another embodiment; and

FIG. 3 is a partial sectional view of a further embodiment.

Referring now particularly to FIG. 1 of the drawings, an inflator 10 according to this invention includes a cylindrical pressure vessel 12 which includes an integral wall 14 closing one end thereof. A cylindrical combustion chamber 16 fits within the pressure vessel and includes a wall 18 closing the inner end thereof and provided with a cylindrical outlet 20 coaxial with the combustion chamber. Wall 18 includes a reduced diameter portion 22. The other end of the combustion chamber includes an outwardly flaring or conical wall 24 which terminates in a radial flange 26. Flange 26 seats against the other open end of the pressure vessel and is welded thereto at 28 in a conventional manner in order to close the pressure vessel. The pressure vessel is filled with any suitable gas under pressure, such as argon at 2,400 psi.

The combustion chamber 16 includes a cartridge assembly 30 which is disclosed in detail and claimed in copending applications Ser. No. 331,663, Charles N. Hay, filed Feb. 12, 1973, and Ser. No. 373,282, Philip B. Zeigler, filed June 25, 1973, both assigned to the assignee of this invention. Generally, the cartridge assembly 30 includes a cylindrical plastic housing 32 which fits within the combustion chamber and contains a cylindrical charge 34 of propellant which generates high pressure, high temperature gases when the charge is initiated. Propellants such as this are known in the art and therefore no further description is necessary. The outer integral end wall 36 of the housing 32 is substantially thick and is provided with a pair of bores 38 and 40. Bore 38 contains an igniter or initiating element 42 and bore 40 likewise contains a squib 44. Retained within the bore 40 to the right of squib 44 is a conventional ball 46.

The inner end of the housing 32 includes a partial radial flange 48 which seats and retains a closure plate 50 having a central fluted orifice 52. The outlet 20, the orifice 52 and the ball 46 are coaxial. A seal plate 54 is secured to the wall 36 and mounts an electrical plug 56. The plug 56 is connected to the igniter 42 and squib 44 by electrical wires extending through the seal plate. The cartridge assembly is retained within the combustion chamber by a circular split ring 58 engaged in a semicircular groove in the combustion chamber wall and also engaged by the chamfered outer edge of the seal plate.

The plug 56 connects the igniter and squib with a known multi-level actuation system for a vehicle occupant restraint system. Such actuation systems can include a velocity responsive sensor and an inertia responsive sensor. Should the velocity responsive sensor or the inertia sensor sense low level impact conditions, the igniter 42 will be connected with the vehicle battery or other source of power to thereby initiate the charge 34 of propellant to generate high temperature, high pressure gases. Should the impact conditions sensed be of a higher level, then the squib 44 is connected to the same source of power to fire the ball 46 into the orifice 52. This restricts the orifice area and increases the pressure within the combustion chamber to increase the burn rate. The foregoing description is brief but reference may be had to the aforenoted copending applications for further details.

A seal 60 includes a cylindrical axial wall or skirt 62 which telescopes over the wall portion 22 of wall 18 and is welded or otherwise fixedly secured thereto. The skirt 62 is integrally joined to a base wall 64 of the seal which is provided with a peripheral rib 66 and an intermediate coaxial rib 68 extending oppositely of each other. Normally the wall 64 and the rib 68 are very slightly spaced from the wall 18 as shown in FIG. 1.

A rod 70 has a headed one end 72 extending through an opening of wall 64 and welded thereto.

A pair of opposed V shaped cross section circular grooves 73 and 74 in the wall 14 of the pressure vessel define a severable plug or seal 76. A generally frustoconical shaped abutment 78 on the inner surface of the seal is surrounded by a radially flanged cylindrical sleeve 80. Sleeve 80 is formed separately from wall 14 and welded or otherwise fixedly secured thereto around the abutment 78. The headed other end 82 of the rod 70 seats against the abutment 78 and is engaged by the radial flange of the sleeve 80 so that the rod fixedly or rigidly interconnects the seals 64 and 76.

When the inflator 10 is initially assembled, the base wall 64 and rib 68 of the seal 60 will be located as shown in FIG. 1 with respect to the inner surface of wall 18. When the presure vessel 12 is then filled with pressure fluid at a pressure of 4500 to 5000 psi for test purposes, the pressure of the fluid will deflect the wall 64 slightly to the left so that the rib 68 seats against the inner surface of wall 18. This backs up or supports the wall 64 on the combustion chamber. The deflection of wall 64 is permitted by the oppositely extending circular ribs 66 and 68 and corresponds the spacing between the wall 64 and the seal 76 to the length of the rod 70 so that the rod fixedly interconnects the wall 64 and the seal 76 and exerts equal and opposite forces on the wall and seal under the pressure of the fluid.

By interconnecting the seal 76 and the wall 64 through rod 70, the pressure of the fluid tending to rupture the seal 76 from the pressure vessel is resisted by the pressure of the fluid on the wall 64 tending to rupture it from the pressure vessel in an opposite direction through the opening 20. Additionally, the wall 64 is backed up by the combustion chamber outlet wall. Thus, both the seal for the pressure vessel and the seal for the combustion chamber mutually cooperate with each other in resisting rupture under the pressure of the fluid within the pressure vessel. Since the seals cooperate with each other, they can be of lower strength than would normally be required in order to resist or withstand the test pressure of the pressure vessel. Once the pressure vessel has been tested, the pressure of the pressure fluid is reduced to the nominal working pressure, such as 2,400 psi. Should for any reason the wall 64 and seal 76 not be fixedly interconnected by the rod 70, either one or both will, of course, rupture to given an indication that the inflator 10 has not passed this test. Wall 64 remains seated on wall 18 after the test so as to be backed up by the latter under the nominal working pressure.

When the charge 34 of propellant within the combustion chamber is initiated, the resultant high temperature, high pressure gases rupture or sever the wall 64 from the skirt 62 either at the rib 66 or the rib 68. When this occurs, the rod 70 is instantaneously shifted to the right to sever the seal 76 from the pressure vessel wall 14 and communicate the pressure vessel with an occupant restraint cushion. This communication occurs through an outlet member 84 which surrounds the seal 76 and is welded to wall 14. The outlet member includes a plurality of radial openings 86 which communicate with a manifold 88 telescoped over the outlet member and secured thereto by a threaded extension 90 of the outlet member and a nut 92. The manifold conventionally communicates with the diffuser, not shown, which in turn communicates with the cushion.

FIG. 2 shows an alternate embodiment wherein like numerals have been used for like parts. In this embodiment, the sleeve 80' is provided with one or more slots 94 to permit snap assembly of the frustoconical head 96 of the rod 70' and the sleeve 80' rather than requiring the sleeve to be flanged over the head of the rod as in the preferred embodiment. The head 96 seats on abutment 78 after assembly.

In the embodiment shown in FIG. 3, the rod 70'' is provided with an annular toothed end 98. The toothed end 98 is received within a slotted sleeve 100 which is secured to seal 76 and provided with an inner complementary toothed portion 102 receiving the toothed portion 98 of the rod. The annular teeth of the rod and sleeve are angled such as to permit easy assembly and hard disassembly of the rod and seal.

Thus, this invention provides an improved inflator.

I claim:

1. An inflator comprising, in combination, a pressure vessel containing pressure fluid and having an outlet for communicating the inflator with an occupant restraint cushion, first closure means closing the outlet, a combustion chamber containing a charge of propellant for generating gas and having an outlet for communicating the combustion chamber with the pressure vessel, second closure means closing the chamber outlet, the first and second closure means being rupturable in directions opposite of each other under the pressure of the fluid within the pressure vessel, rigid elongate means, means mounting the rigid means to each closure means whereby each closure means under the pressure of the fluid within the vessel exerts a force on the other closure means in a direction opposite its rupturable direction, and means for adjusting one of the mounting means to correspond the spacing of the first and second closure means to the length of the rigid elongate means.

2. An inflator comprising, in combination, a pressure vessel containing pressure fluid and having an outlet for communicating the inflator with an occupant restraint cushion, a rupturable closure closing the outlet, a combustion chamber containing a charge of propellant for generating gas and having an outlet for communicating the combustion chamber with the pressure vessel, closure means closing the chamber outlet and including a pressure deflectable and rupturable portion, the closure being rupturable in one direction under the pressure of the fluid within the pressure vessel and the pressure deflectable portion being deflectable and rupturable in an opposite direction under the pressure of the fluid within the pressure vessel, and rigid elongate means interconnecting the closure and the deflectable portion of the closure means, the closure and the deflectable portion under the pressure of the fluid within the vessel each exerting a force on the other in a direction opposite its rupturable direction, the deflection of the deflectable portion corresponding the length of the elongate means to the spacing of the closure and deflectable portion.

3. An inflator comprising, in combination, a pressure vessel containing pressure fluid, a combustion chamber containing a charge of propellant for generating gas and having an outlet for communicating the combustion chamber with the pressure vessel, closure means closing the chamber outlet, and including a pressure deflectable portion, and rigid elongate means interconnecting a portion of the pressure vessel and the pressure deflectable portion to support the pressure deflectable portion against rupture under the pressure of the fluid within the vessel, the pressure deflectable portion deflecting under the pressure of the fluid to correspond the length of the elongate means to the spacing between the deflectable portion and pressure vessel portion.

4. An inflator comprising, in combination, a pressure vessel containing pressure fluid and having an outlet portion for communicating the inflator with an occupant restraint cushion, rupturable closure means closing the outlet, rigid elongate means, first means mounting one end of the rigid elongate means to the outlet portion of the pressure vessel, second means mounting the other end of the rigid elongate means to another portion of the pressure vessel, one of said mounting means including means for adjusting the rigid elongate means relative to a respective portion of the pressure vessel under the pressure of the fluid within the pressure vessel for corresponding the spacing of the mounting means to the length of the rigid elongate means.

* * * * *